United States Patent [19]
Mumford et al.

[11] Patent Number: 5,548,951
[45] Date of Patent: Aug. 27, 1996

[54] SYSTEM FOR CONTROLLING COMBUSTION IN A GAS COMBUSTION-TYPE TURBINE

[75] Inventors: Stephen E. Mumford, Longwood; Andrew J. Kosinski, Winter Springs, both of Fla.

[73] Assignee: Westinghouse Electric Corporation, Pittsburgh, Pa.

[21] Appl. No.: 433,649

[22] Filed: May 9, 1995

Related U.S. Application Data

[63] Continuation of Ser. No. 161,034, Dec. 3, 1993, abandoned.
[51] Int. Cl.$^6$ .................................................. F02C 9/16
[52] U.S. Cl. ........................ 60/39.23; 60/39.29; 60/39.5
[58] Field of Search ............................... 60/39.23, 39.27, 60/39.29, 39.5

[56] References Cited

U.S. PATENT DOCUMENTS 4,138,842  2/1979  Zwick ..................................... 60/39.23
4,628,687  12/1986  Strom ..................................... 60/39.23
5,230,212  7/1993  Forestier .............................. 60/39.23

FOREIGN PATENT DOCUMENTS 150432  6/1988  Japan ..................................... 60/39.23

Primary Examiner—Louis J. Casaregola
Attorney, Agent, or Firm—M. G. Panian

[57] ABSTRACT

An improved combustion system that is constructed and arranged to be used with a power-generating turbine or the like includes at least one combustion chamber, a fuel supply system for supplying fuel to the combustion chamber, an air supply system for supplying air from a pressurized air source to the combustion chamber, a monitor for monitoring a property of the combustion products from the combustion chamber, a regulator for regulating an air to fuel ratio in the combustion chamber, and a controller, in communication with the monitor and the regulator for controlling the regulator in response to information received from the monitor. According to one novel aspect of the invention, the controller controls the regulator with no direct mechanical linkage therebetween, so that the complexity and expense of the system is kept to a minimum.

11 Claims, 5 Drawing Sheets

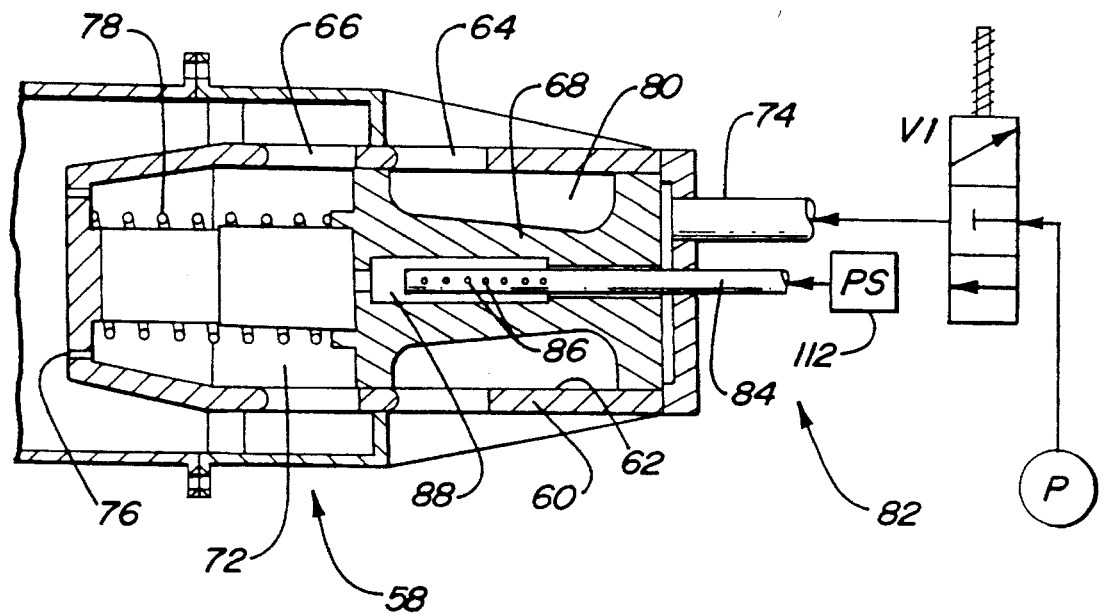
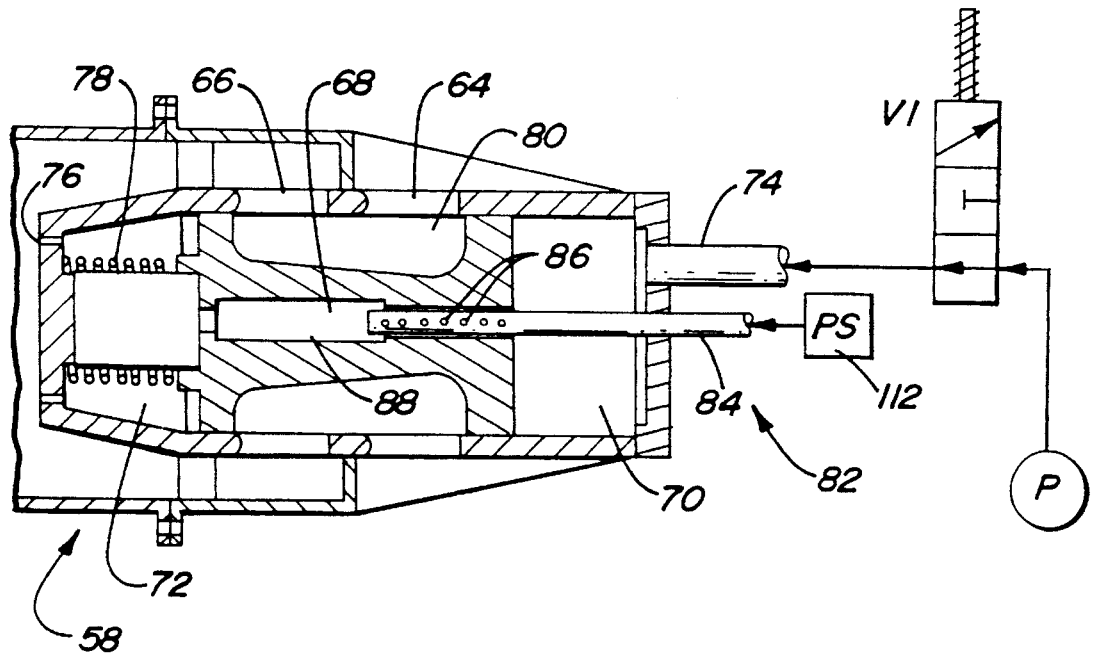
FIG. 4

SYSTEM FOR CONTROLLING COMBUSTION IN A GAS COMBUSTION-TYPE TURBINE

This application is a division, of application Ser. No. 08/161,034 filed Dec. 3, 1993 (abandoned).

BACKGROUND OF THE INVENTION

1. Field of the Invention

This invention relates generally to a system and a method for controlling the combustion process in a continuous-type fuel combustion system. More specifically, this invention relates an improved system for regulating the air/fuel ratio in a gas combustion-type turbine system.

2. Description of the Prior Art

Gas combustion-type turbine systems like those manufactured by the assignee of this invention, Westinghouse Electric Company, are in common use for power generation purposes throughout the world.

A conventional gas turbine combustion system 10 is depicted in FIG. 1. In such a conventional system 10, a compressor fan 14 forces intake air into a chamber 16. System 10 further includes a plurality of combustion baskets 18, each of which have a combustion chamber 20 that is separated into primary and secondary combustion chambers. Each basket 18 is communicated, by known structure and controls, with a fuel supply 22 for supplying fuel to combustion chamber 20, as well as a number of fixed nozzles 24 for admitting pressurized fuel into combustion chamber 20.

To optimize the efficiency of system 10, and to keep the combustion process as clean and pollutant-free as possible, turbine system 10 includes a system 28 for regulating the air/fuel mixture that is provided to combustion chamber 20. As will be seen in FIG. 1, each basket 18 includes a transition piece 46 that defines a transition passage 44 between the combustion chamber 20 and a turbine intake area 48. The turbine intake area 48 is characterized by the stationary vane 11 that is shown in FIG. 1. As is also shown in FIG. 1, a butterfly valve 42 is provided for admitting pressurized air from chamber 16 to the transition piece 46, well downstream of the combustion chamber 20. When butterfly valve 42 is open, pressurized air bypasses chamber 16, thereby reducing the amount of air that is forced into the inlets 24 of combustion chamber 20. Accordingly, by opening butterfly valve 42, the air/fuel ratio in combustion chamber 20 is reduced. By closing butterfly valve 42, conversely, the air/fuel ratio in combustion chamber 20 can be increased.

A mechanical control linkage 40 is provided in conventional system 10 for opening and closing butterfly valve 42. As may be seen in FIG. 1, an external rotating ring 30 is provided outside housing 12 for movement on bearings 32. Each butterfly valve 42 is coupled to a control rod 31 that passes through a hole in housing 12. One tie rod 34 is secured to external sliding ring 30. A second tie rod 38 is secured to a top end of control rod 31. Tie rods 34, 36 are connected together by a ball pivot 36. Accordingly, when rotating ring 30 is shifted in one direction or another, it causes the control rods 31 for the respective gaskets 18 to turn to a desired extent in one direction or another, to control the operation of the respective butterfly valves 42.

Although regulating systems of the type depicted in FIG. 1 operate effectively, the systems tend to be expensive and time consuming to manufacture. Manufacture of such systems entails forming a number of holes in the housing, as well as positioning the control linkage that controls the respective butterfly valves. It is clear that a need exists for a simpler and less expensive air/fuel regulating system.

SUMMARY OF THE INVENTION

Accordingly, it is an object of the invention to provide a regulating system for gas turbines that is effective, but less time consuming, expensive and complex to manufacture and assemble than regulating systems that are heretofore known.

In order to achieve the above and other objects of the invention, an improved combustion system that is constructed and arranged to be used with a power-generating turbine or the like includes at least one combustion chamber; a fuel supply for supplying fuel to the combustion chamber; an air supply for supplying air from a pressurized air source to the combustion chamber; a monitor for monitoring a property of the combustion products; a regulator for regulating an air-to-fuel ratio in the combustion chamber; and a controller, in communication with the monitor and the regulator, for controlling the regulator in response to information received from the monitor, a controller controlling the regulator with no direct mechanical linkage there between, whereby the complexity and the expense of the system is kept to a minimum.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3 is a partially schematic fragmentary cross-sectional view through one component of the embodiment of the system that is shown in FIG. 2;

FIG. 4 is a partially schematic fragmentary cross-sectional view of the component depicted in FIG. 3, shown in a second operating position;

DETAILED DESCRIPTION OF THE PREFERRED EMBODIMENT(S)

Figure 1:
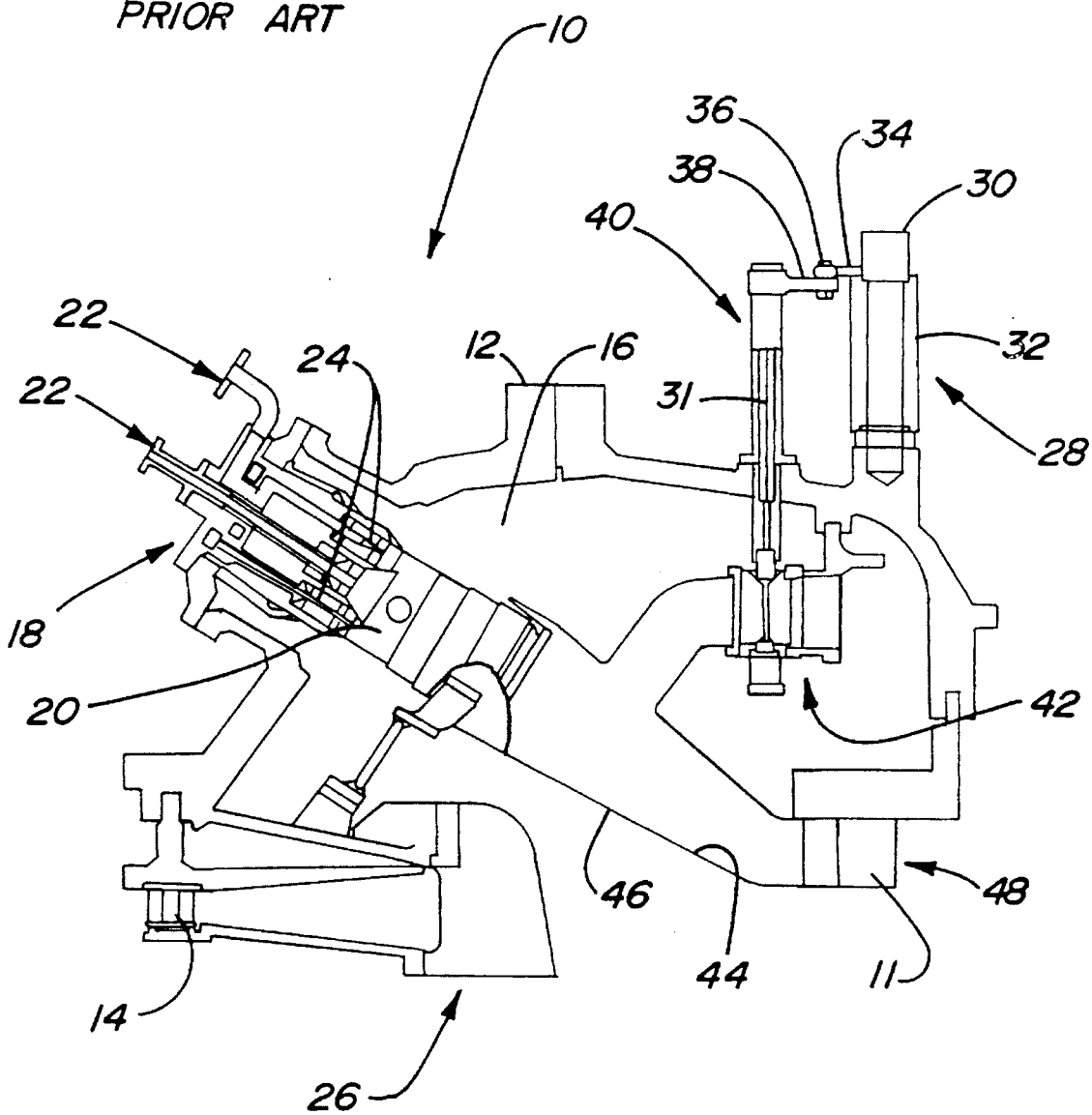
FIG. 1 is a fragmentary cross-sectional view of a convention gas turbine system.
Figure 2:
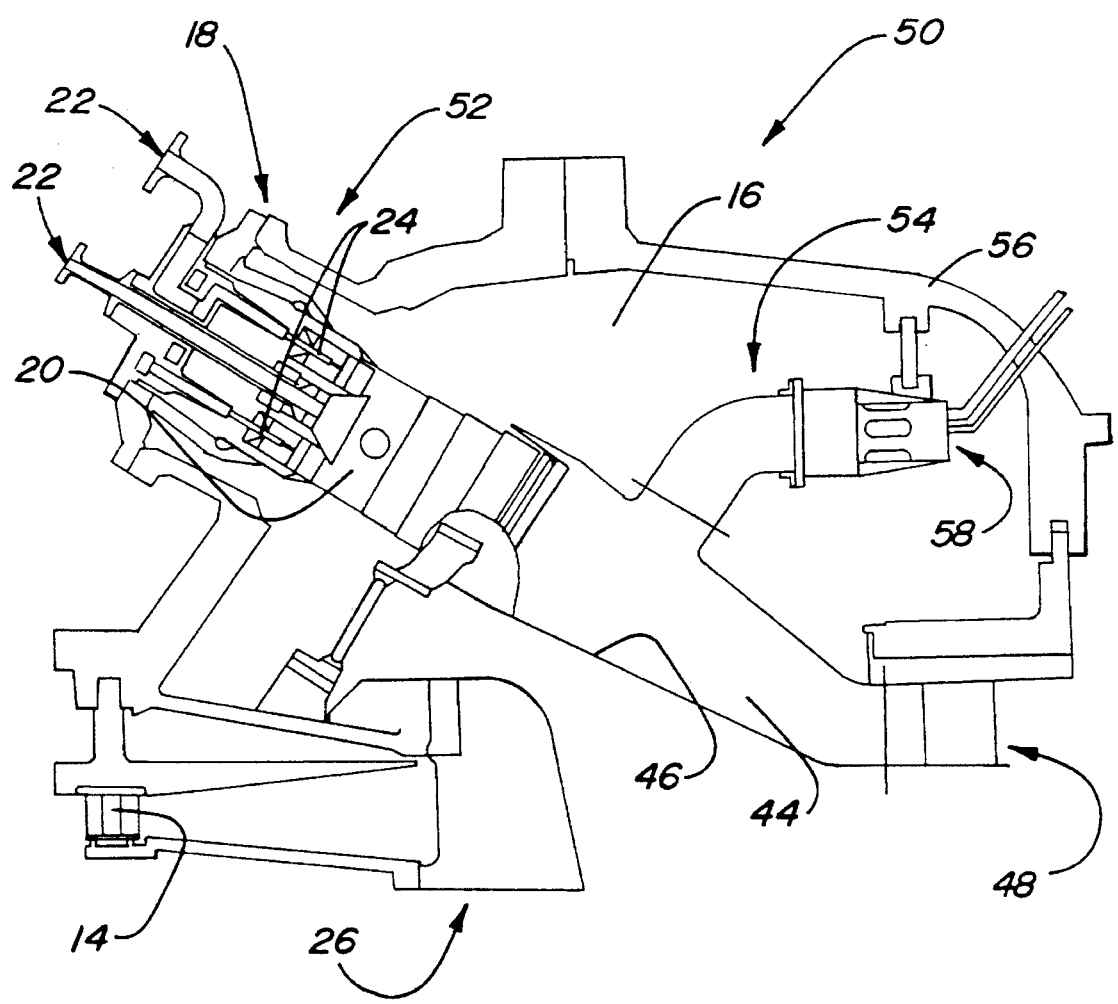
FIG. 2 is a fragmentary cross-sectional view of a gas turbine system constructed according to a first embodiment of the invention.

Referring now to the drawings, wherein like reference numerals designate corresponding structure throughout the views, in referring in particular to FIG. 2, an improved gas turbine system 50 that is constructed according to a first preferred embodiment of the invention differs from the conventional system shown in FIG. 1 in that it incorporates an improved combustion system 52 having no control linkage 40, but instead, a pneumatically actuatable valve 58 that is mounted within a housing 56. As may be seen in FIG. 2, housing 56 does not have a plurality of holes formed therein for admitting a mechanical linkage, as does the housing 12 in the conventional gas turbine system 10.

Referring now to FIGS. 3 and 4, pneumatically actuatable valve 58 includes a cylinder 60 having a bore defined by an inner wall 62, an intake port 64 and an outlet port 66. A piston 68 is mounted for reciprocation within the bore that is defined by inner wall 62. Piston 68 defines a rear pneumatic chamber 70 and a forward pneumatic chamber 72, as can best be seen in FIG. 4. Rear pneumatic chamber 70 is in communication with a pneumatic tube 74 that has a pressure-regulated valve $V_1$ interposed therein between rear pneumatic chamber 70 and a pressure source P. Forward pneumatic chamber 72 is in communication with transition piece 46 via a number of pressure relief ports 76.

As may be seen in FIGS. 3 and 4, a compression spring 78 is provided in forward pneumatic chamber 72 for biasing piston 68 rearwardly, toward the position shown in FIG. 3, with respect to cylinder 60. In the position shown in FIG. 3, piston 68 seals intake port 64, which is in communication with pressurized chamber 16, with respect to outlet port 66, which is in communication with the transition passage 44 within transition piece 46. In the position shown in FIG. 4, the passages 80 defined in piston 68 fully communicate intake port 64 with outlet port 66. In this position, accordingly, the pressurized chamber 16 is communicated with transition passage 44 to the fullest extent anticipated by the design of system 52. The operation of the regulating system 54 will be discussed in greater detail below.

Referring again to FIGS. 3 and 4, a position sensing system 82 is provided to sense the displacement of piston 68 within cylinder 60 and thus, the extent to which the valve 58 is opened or closed. Position sensing system 82 includes a stationary tube 84 that is fixed with respect to cylinder 60, and has a plurality of ports 86 defined therein at a forward end thereof, as may be seen in FIGS. 3 and 4. A space 88 is defined in an interior portion of piston 68, and is communicated with the forward chamber 72 that is defined by the piston 68 within cylinder 60. A position sensor 112 communicates tube 84 to a source of pressurized air that has a known pressure. The volumetric flow of pressurized air that occurs through stationary tube 84 is a function of the number of ports 86 that are covered or uncovered as the piston 68 is extended and retracted within the cylinder 60. For instance, in the position shown in FIG. 3, all of the ports 86 are exposed, and the volumetric flow of pressurized air through stationary tube 84 will be relatively high. In the position shown in FIG. 4, relatively few ports are exposed, and the volumetric flow of air through the stationary tube 84 will be quite low. Position sensor 112 senses the volumetric flow through tube 84, and thus permits calculation of the position of piston 68 within cylinder 60 as will be described in greater detail below.

Figure 5:
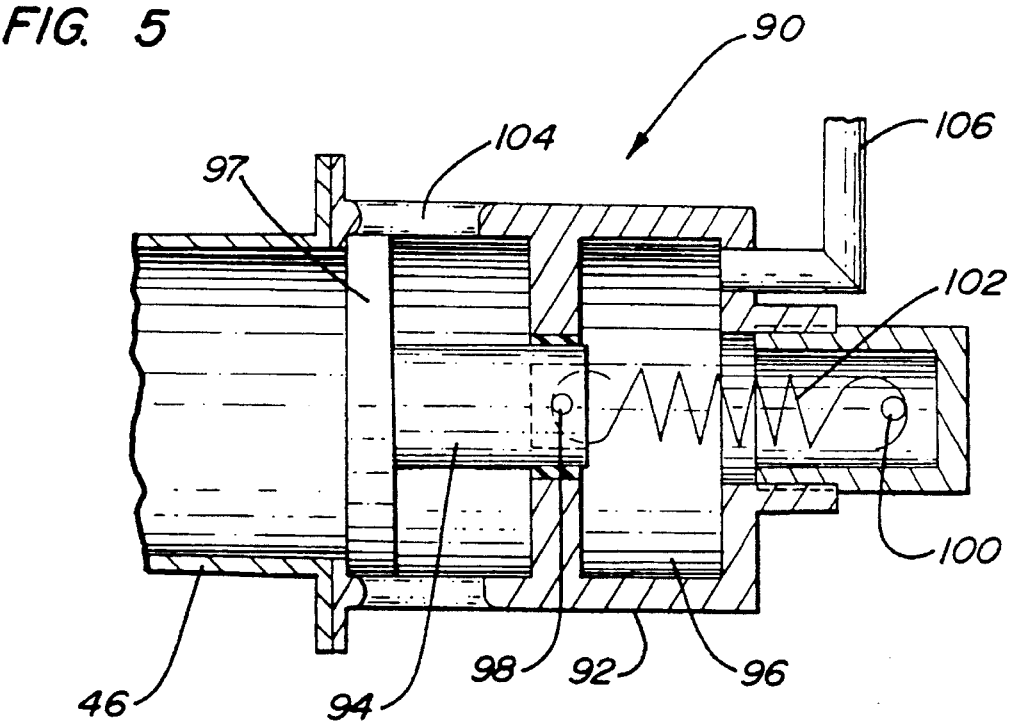
FIG. 5 is a partially schematic fragmentary cross-sectional view of a second embodiment of the component that is depicted in FIGS. 3 and 4.
Figure 6:
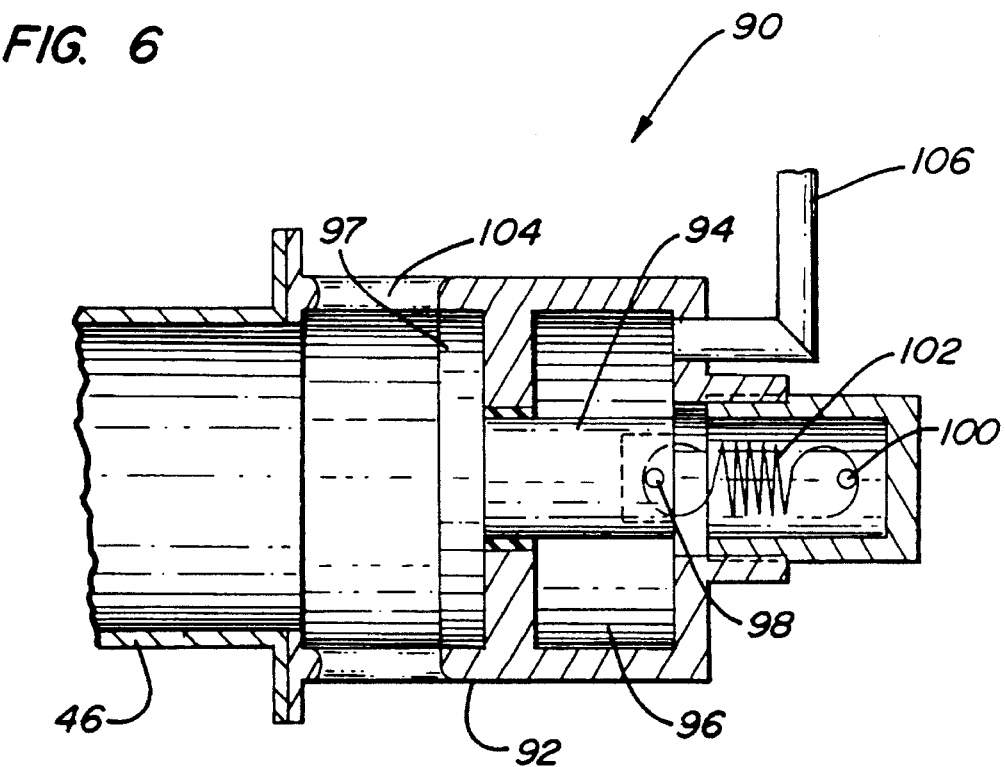
FIG. 6 is a partially schematic fragmentary cross-sectional through the component depicted in FIG. 5, shown in a second operating position.

Referring now to FIGS. 5 and 6, a pneumatically actuatable valve 90 constructed according to a second embodiment of the invention can be used in lieu of the pneumatically actuatable valve 58 shown in FIGS. 3 and 4. Valve 90 includes a housing 92 that has a piston 94 mounted for reciprocation therein. Housing 92 further has an inlet 104 defined therein and piston 94 incorporates a valving ring 97 for sealing and unsealing inlet 104 with respect to transition piece 46. A tension spring 102 is mounted at a first end to a pin 98 provided on piston 94, and at second end to a pin 100 mounted on housing 92. A pneumatic tube 106 is communicated with chamber 96, as may also be seen in FIGS. 5 and 6. Pneumatic tube 106 is communicated to a pressure source P, with a valve V interposed therein, in the manner that is depicted in FIGS. 3 and 4.

Figure 7:
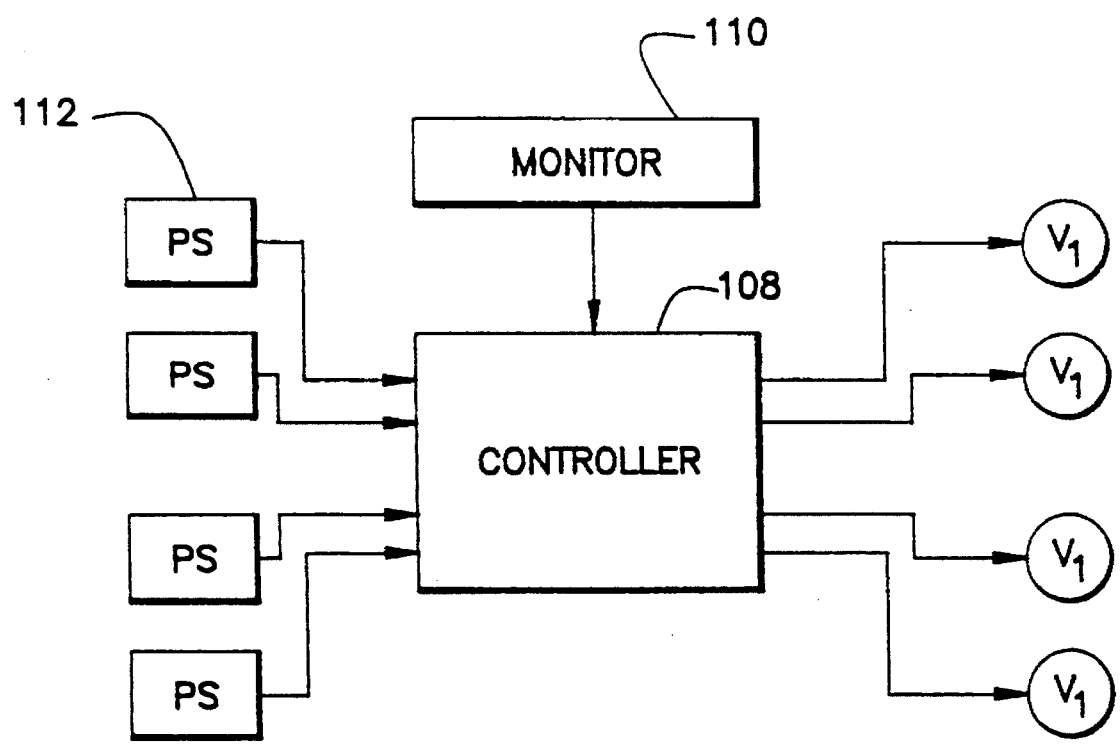
FIG. 7 is a schematic diagram depicting a control system for the embodiment of the invention that is depicted in FIGS. 2–4.

Referring now to FIG. 7, it will be seen that system 50 further includes a controller 108, and monitor 110 that is positioned downstream of combustion chamber 20 for sensing a condition of the combustion products that escape from combustion chamber 20. In the preferred embodiment, monitor 110 is constructed and arranged to sense a pollutant, the formation of which is dependent upon the air/fuel ratio within the combustion chamber 20 during operation. In the most preferred embodiment, monitor 110 is constructed and arranged to sense the level of nitrous oxide in the combustion products.

In operation, monitors 110 continuously sense the combustion products from the various combustion chambers 20 in system 50. At the same time, controller 108 monitors the pressure of the compressed air that the position sensors 112 are providing to the various stationery tubes 84 in the pneumatically actuatable valves 58 for the respective regulating systems 54, as well as monitoring the volumetric flow of air through the respective stationery tubes 84. With this information, controller 108 calculates and monitors the extent to which valves 58 are open or closed. If, after considering the information received from monitor 110, controller 108 determines that the mixture within combustion chamber 20 is too lean, controller 108 will instruct the respective valves $V_1$ to open for a calculated period of time, to introduce pressurized air into the rear pneumatic chambers 70 of the respective valves 58, thereby creating or increasing the degree of communication between intake ports 64 and outlet ports 66 and thus, the pressurized chamber 16 within housing 56 and the transition passage 44 within transition piece 46. As communication between chamber 16 and passage 44 increases, pressurized air in chamber 16 bypasses the inlets 24 of combustion chamber 20. Accordingly, the mixture within combustion chamber 20 becomes richer. Controller 108 continues to sense the position of valves 58 during this process.

If the mixture within combustion chamber is too rich, as determined by controller 108 based on information received from monitor 110, controller 108 will instruct valves $V_1$ to move to a position whereby pressurized air from rear pneumatic chamber 70 is released to atmosphere. As this occurs, piston 68 will move rearwardly within cylinder 60 under the bias provided by compression spring 78 to move the valve 58 toward the closed position, which decreases the communication between pressurized chamber 16 and transition passage 44. As this occurs, pressurized air is forced into the inlets 24 of combustion chamber 20, thereby decreasing the richness of the mixture.

In the embodiment of the invention that is depicted in FIGS. 5 and 6, the control system would be identical to that illustrated in FIG. 7, with the exception that position sensors 112 are preferably not provided, although they could be provided within the scope of the invention. Controller 108 would open or close valve 90 by introducing or releasing pressurized air to or from the chamber 96 in housing 92. When pressurized air is introduced into chamber 96, valve 90 will tend to close. When pressurized air is released from chamber 96, valve 90 is opened.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An improved combustion system that is constructed and arranged to be used with a power-generating turbine or the like, comprising:

at least one combustion chamber;

fuel supply means for supplying fuel to said at least one combustion chamber;

air supply means for supplying air from a pressurized air source to said at least one combustion chamber;

a monitor for monitoring a property of said combustion system;

a housing having an inlet port associated with said air supply means and an outlet port associated with said at least one combustion chamber for placing said air supply means in fluid communication with said at least one combustion chamber;

a fluid-actuated piston located within said housing and movable between a first position wherein said piston completely interrupts said fluid communication and a second position wherein said piston has no effect on said fluid communication; and a controller in fluid communication with said fluid-actuated piston for controlling the position of said fluid-actuated piston within said housing in response to information received from said monitor.

2. The system according to claim 1, further comprising means for biasing said piston in one of said first or second positions.

3. The system according to claim 2, wherein said piston further comprises a passageway such that said passageway interconnects said inlet and said outlet when said piston is positioned in said second position.

4. A system according to claim 1, wherein said monitor is constructed and arranged to monitor a pollutant that is a combustion by-product.

5. A system according to claim 1, wherein said monitor is constructed and arranged to monitor nitrous oxide.

6. A system according to claim 2, wherein said biasing means biases said piston toward said first position.

7. A system according to claim 2, wherein said biasing means comprises a spring.

8. A system according to claim 7, wherein said spring comprises a compression spring.

9. A system according to claim 7, wherein said spring comprises a tension spring.

10. A system according to claim 1, further comprising means, in communication with said controller, for sensing the position of said fluid-actuated piston.

11. A system according to claim 10, wherein said sensing means is pneumatic.

* * * * *